United States Patent [19]

Steiert et al.

[11] Patent Number: 5,135,971
[45] Date of Patent: Aug. 4, 1992

[54] FLAMEPROOFED THERMOPLASTIC MOLDING COMPOSITIONS BASED ON PHLEGMATIZED RED PHOSPHORUS

[75] Inventors: Peter Steiert, Ludwigshafen; Hans-Peter Weiss, Mutterstadt; Christoph Plachetta, Limburgerhof; Petra Baierweck, Schifferstadt; Klaus Muehlbach, Heppenheim; Brigitte Gareiss, Ludwigshafen, all of Fed. Rep. of Germany

[73] Assignee: BASF Aktiengesellschaft, Ludwigshafen, Fed. Rep. of Germany

[21] Appl. No.: 665,320

[22] Filed: Mar. 6, 1991

Related U.S. Application Data

[62] Division of Ser. No. 469,396, Jan. 24, 1990, Pat. No. 5,049,599.

[30] Foreign Application Priority Data

Feb. 18, 1989 [DE] Fed. Rep. of Germany ....... 3905038

[51] Int. Cl.$^5$ .......................... C08K 9/10; C08K 3/32
[52] U.S. Cl. ...................................... 524/80; 523/210
[58] Field of Search ................. 524/80, 606, 608; 523/210; 525/133, 166, 184, 425, 183

[56] References Cited

U.S. PATENT DOCUMENTS

| | | | |
|---|---|---|---|
| 4,105,735 | 8/1978 | Dany et al. | 524/399 |
| 4,188,313 | 2/1980 | Cerny et al. | 524/114 |
| 4,229,340 | 10/1980 | Druin et al. | 525/425 |
| 4,430,484 | 2/1984 | Quinn | 525/425 |
| 4,554,320 | 11/1985 | Reimann et al. | 525/184 |
| 4,670,484 | 6/1987 | Fuchs et al. | 524/416 |
| 4,772,642 | 9/1988 | Staendeke | 523/205 |
| 4,788,249 | 11/1989 | Maresca et al. | 325/425 |
| 4,818,793 | 4/1989 | Matthies et al. | 525/183 |
| 4,849,476 | 7/1989 | Mashita et al. | 525/183 |
| 4,853,424 | 8/1989 | Staendeke et al. | 524/416 |
| 4,879,067 | 11/1989 | Sakon et al. | 523/205 |
| 4,923,924 | 5/1990 | Grant | 525/183 |

FOREIGN PATENT DOCUMENTS

| | | |
|---|---|---|
| 71788 | 2/1983 | European Pat. Off. |
| 2408488 | 8/1975 | Fed. Rep. of Germany |
| 2625674 | 12/1976 | Fed. Rep. of Germany |
| 2745076 | 4/1978 | Fed. Rep. of Germany |
| 2703052 | 7/1978 | Fed. Rep. of Germany |
| 1543511 | 4/1979 | United Kingdom |
| 1592813 | 7/1981 | United Kingdom |

Primary Examiner—Veronica P. Hoke
Attorney, Agent, or Firm—Oblon, Spivak, McClelland, Maier & Neustadt

[57] ABSTRACT

Flameproofed thermoplastic molding compositions contain
(A) 10–99% by weight of a thermoplastic polyamide or polyester or polyphenylene ether or a mixture thereof,
(B) 1–50% by weight of red phosphorus having a particle size of up to 2 mm which contains, per 100 parts by weight, from 0.05 to 5 parts by weight of a polyurethane or polyester-polyurethane as phlegmatizer,
(C) 0–60% by weight of a fibrous or particulate filler or a mixture thereof and
(D) 0–20% by weight of an elastomeric polymer.

12 Claims, No Drawings

FLAMEPROOFED THERMOPLASTIC MOLDING COMPOSITIONS BASED ON PHLEGMATIZED RED PHOSPHORUS

This is a division, of application Ser. No. 07/469,396, filed on Jan. 24, 1990 now U.S. Pat. No. 5,049,599.

The present invention relates to flameproofed thermoplastic molding compositions containing (A) 10–99% by weight of a thermoplastic polyamide or polyester or polyphenylene ether or a mixture thereof,
(B) 1–50% by weight of red phosphorus having a particle size of up to 2 mm which contains per 100 parts by weight from 0.05 to 5 parts by weight of a polyurethane or polyester-polyurethane as phlegmatizer,
(C) 0–60% by weight of a fibrous or particulate filler or a mixture thereof and
(D) 0–20% by weight of an elastomeric polymer.

The present invention also relates to the use of these molding compositions for producing fibers, films and moldings, and to the moldings obtainable from the molding compositions according to the present invention.

The incorporation of red phosphorus into polymer melts presents safety problems due to dust and the release of phosphines.

DE-A-2 703 052 discloses flame-resistant thermoplastic molding compositions in which the red phosphorus is stabilized by addition of aluminum or magnesium salts of ethylenediaminetetraacetic acid (EDTA) or nitrolotriacetic acid (NTA).

However, the metal ions cause a deterioration in the electric properties of the plastics moldings, thereby restricting their possible uses.

EP-A-71 788 discloses polyamide molding compositions in which the red phosphorus has been coated with phenol/isobutyraldehyde or cyclohexanone carrier resins prior to incorporation.

Further phenolic formaldehyde type carrier resins for use as coatings for phosphorus are known from DE-A-2 745 076.

On incorporating such a pretreated phosphorus into the polymer melt, the carrier resins are partially degraded. The resulting formaldehyde reacts with the thermoplastic, causing a general deterioration in the mechanical properties of the moldings producible therefrom.

Furthermore, DE-A-2 408 488 discloses a wax or waxy substances for use as a carrier material for red phosphorus.

In addition, DE-A-2 625 674 discloses epoxycontaining compounds for use as carrier resins for red phosphorus.

However, these carrier resins lack compatibility with thermoplastics, the resultant agglomeration making it difficult to incorporate the red phosphorus and the low adhesion leading to deterioration in the mechanical properties of the moldings producible therefrom.

It is an object of the present invention to provide readily accessible flameproofed thermoplastic polyamide or polyester molding compositions which combine good low-flammabiilty characteristics with good mechanical characteristics. In addition, the thermal stability of the flameproofing phosphorous combination used should also be adequate.

We have found that this object is achieved by the flameproofed molding compositions defined at the beginning.

Preferred molding compositions of this kind and the use thereof are specified in subclaims.

Component (A) of the molding compositions according to the present invention comprises from 10 to 99, preferably from 10 to 94, in particular from 15 to 85, % by weight of a thermoplastic polyamide or polyester or polyphenylene ether or a mixture thereof.

In general, polyesters based on aromatic dicarboxylic acids and an aliphatic or aromatic dihydroxy compound are used.

A first group of preferred polyesters are polyalkylene terephthalates having from 2 to 10 carbon atoms in the alcohol moiety.

Such polyalkylene terephthalates are known per se and described in the literature. Their main chain contains an aromatic ring derived from the aromatic dicarboxylic acid. The aromatic ring may also be substituted, for example by halogen such as chlorine or bromine or by $C_1$–$C_4$-alkyl such as methyl, ethyl, i-propyl, n-propyl and n-, i- or t-butyl.

These polyalkylene terephthalates can be prepared in a conventional manner by reacting aromatic dicarboxylic acids, or esters or other ester-forming derivatives thereof with aliphatic dihydroxy compounds.

Preferred dicarboyxlic acids are naphthalenedicarboxylic acid, terephthalic acid, isophthalic acid and mixtures thereof. Up to 30 mol %, preferably not more than 10 mol %, of the aromatic dicarboyxlic acids may be replaced by aliphatic or cycloaliphatic dicarboxylic acids such as adipic acid, azelaic acid, sebacic acid, dodecanedioic acids and cyclohexanedicarboyxlic acids.

Of the aliphatic dihydroxy compounds, diols of from 2 to 6 carbon atoms, in particular 1,2-ethanediol, 1,4-butanediol, 1,6-hexanediol, 1,4-hexanediol, 1,4-cyclohexanediol, neopentylglycol and mixtures thereof are preferred.

Particularly preferred polyesters (A) are polyalkylene terephthalates derived from alkanediols of from 2 to 6 carbon atoms. Of these, in particular polyethylene terephthalate and polybutylene terephthalate are preferred.

The relative viscosity of the polyesters (A) is in general within the range from 1.2 to 1.8 (measured in 0.5% strength by weight solution in 1:1 w/w phenol/odichlorobenzene at 25° C.)

A further suitable group are wholly aromatic polyesters derived from aromatic dicarboxylic acids and aromatic dihydroxy compounds.

Suitable aromatic dicarboxylic acids are the compounds mentioned above in connection with the polyalkylene terephthalates. Preference is given to mixtures of 5 to 100 mol % of isophthalic acid and from 0 to 95 mol % of terephthalic acid, in particular approximately equivalent mixtures of these two acids.

The aromatic dihydroxy compounds preferably have the general formula I

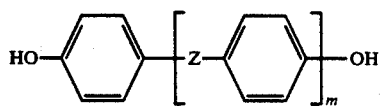

I where Z is alkylene or cycloalkylene of up to 8 carbon atoms, arylene of up to 12 carbon atoms, carbonyl, sulfonyl, oxygen, sulfur or a chemical bond, and m is 0 or 1. The compounds I may also be substituted at the phenyl group by $C_1$-$C_6$-alkyl and fluorine, chlorine or bromine.

Suitable parent structures for these compounds are for example
dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
resorcinol and
hydroquinone and the ring-alkylated or -halogenated derivatives thereof.

Of these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane and
2,2-di(3'-chloro-4'-hydroxyphenyl)propane,
and also in particular to
2,2-di(4'-hydroxyphenyl)propane,
2,2-di(3',5'-dichlorodihydroxyphenyl)propane,
1,1-di(4'-hydroxyphenyl)cyclohexane and
2,2-di(3',5'-dimethyl-4'-hydroxyphenyl)propane and mixtures thereof.

It is of course also possible to use mixtures of polyalkylene terephthalates and wholly aromatic polyesters. These contain in general from 20 to 98% by weight of the polyalkylene terephthalate and from 2 to 80% by weight of the wholly aromatic polyester.

Polyesters suitable for the purposes of the present invention should also include polycarbonates obtainable by polymerization of aromatic dihydroxy compounds, in particular 2,2-bis(4-hydroxyphenyl)propane (bisphenol A), or derivatives thereof, for example with phosgene. Appropriate products are known per se and described in the literature and are mostly also commercially available. The amount of polycarbonate is from 1 to 70 parts by weight, preferably from 2 to 60 parts by weight, based on 100 parts by weight of polyester of component (A) of thermoplastic molding compositions according to the present invention.

The polyamides of the molding compositions according to the present invention have in general a relative viscosity $\eta_{rel}$ of from 1.7 to 5.0, determined in a 1% strength by weight solution in 96% strength by weight sulfuric acid at 25° C., which corresponds to a Fikentscher K value of from 50 to 96. Polyamides having a relative viscosity of from 2.3 to 4.5, in particular from 2.5 to 4.0, are preferred.

Semicrystalline or amorphous resins having a weight average molecular weight of not less than 5,000 as described for example in U.S. Pat. Nos. 2,071,250, 2,071,251, 2,130,523, 2,130,948, 2,241,322, 2,312,966, 2,512,606 and 3,393,210 are preferred.

Examples thereof are polyamides derived from lactams having from 7 yo 13 ring members, such as polycaprolactam, polycapryllactam and polylaurolactam, and also polyamides obtained by reacting dicarboxylic acids with diamines.

Suitable dicarboxylic acids are alkanedicarboxylic acids of from 6 to 12, in particular from 6 to 10, carbon atoms and aromatic dicarboxylic acids. Examples are adipic acid, azelaic acid, sebacic acid, dodecanedioic acid, terephthalic acid and isophthalic acid.

Suitable diamines are in particular alkanediamines of from 6 to 12, in particular from 6 to 8, carbon atoms and also m-xylylenediamine, di(4-aminophenyl)methane, di(4-aminocyclohexyl)methane, 2,2-di(4-aminophenyl)propane and 2,2-di(4-aminocyclohexyl)propane.

Preferred polyamides are polyhexamethyleneadipamide, polyhexamethylenesebacamide and polycaprolactam.

It is also possible to use polyamides which are obtainable by copolyermization of two or more of the aforementioned monomers, and mixtures of pluralities of polyamides.

Examples are partly aromatic copolyamides, in particular those whose units are derived from terephthalic acid and hexamethylenediamine, from adipic acid and hexamethylenediamine or from terephthalic acid, hexamethylenediamine and ε-caprolactam. Suitable such copolyamides are in particular those whose triamine (specifically bishexametylenetriamine) contents are below 0.5% by weight. Appropriate products are obtainable by the process described in EP-A-129 195 and EP-A-129 196.

Other suitable polyamides are obtainable for example by condensing 1,4-diaminobutane with adipic acid at elevated temperature (nylon-4,6). Methods for preparing polyamides of this structure are described for example in EP-A-38 094, EP-A-38 582 and EP-A-39 524.

The polyphenylene ethers (A) present in the molding compositions according to the present invention are known per se. They are compounds based on substituted, in particular disubstituted, polyphenylene ethers in which the ether oxygen of one unit is bonded to the benzene ring of the neighboring unit. Preference is given to using polyphenylene ethers which are substituted in the 2- and/or 6-position relative to the oxygen atom. Examples of substituents are halogen atoms such as chlorine and bromine and alkyl of from 1 to 4 carbon atoms which preferably has no tertiary hydrogen in the α-position, e.g. methyl, ethyl, propyl or butyl. Said alkyl substituents may in turn be substituted by halogen atoms such as chlorine or bromine or by hydroxyl. Further examples of possible substituents are alkoxy radicals, preferably of up to 4 carbon atoms, and unsubstituted or halogen- and/or alkyl-substituted phenyl. It is also possible to use copolymers of different phenols, for example copolymers of 2,6-dimethylphenol and 2,3,6-trimethylphenol. It is of course also possible to use mixtures of different polyphenylene ethers.

Examples of polyphenylene ethers are poly(2,6-dilauryl-1,4-phenylene) ether, poly(2,6-diphenyl-1,4-phenylene) ether, poly(2,6-dimethoxy-1,4-phenylene) ether, poly(2,6-diethoxy-1,4-phenylene) ether, poly(2-methoxy-6-methoxy-1,4-phenylene) ether, poly(2-ethyl-6-stearyloxy-1,4-phenylene) ether, poly(2,6-dichloro-1,4-phenylene) ether, poly(2-methyl-6-phenylene-1,4-phenylene) ether, poly(2,6-dibenzyl-1,4-phenylene) ether, poly(2-ethoxy-1,4-phenylene) ether, poly(2-chloro-1,4-phenylene) ether and poly(2,5-dibromo-1,4-phenylene) ether. Preference is given to using polyphenylene ethers in which the substituents are alkyl radicals of from 1 to 4 carbon atoms, such as poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene)ether,- poly(2,6-dipropyl-1,4-phenylene) ether and poly(2-ethyl-6-propyl-1,4-phenylene) ether.

Suitable polyphenylene ethers for the purposes of the present invention also include those which have been modified with monomers such as fumaric acid, maleic acid or maleic anhydride.

Such modified polyphenylene ethers are known per se. Customarily, the polyphenylene ether $B_1$ is modified by incorporation of at least one carbonyl, carboxylic acid, acid anhydride, acid amide, acid imide, carboxylic ester, carboxylate, amino, hydroxyl, epoxy, oxazoline, urethane, urea, lactam or halobenzyl group. The modification is in general brought about by reaction of a polyphenylene ether with a modifier which contains at least one of the abovementioned groups in solution (WO-A-86/2086), in aqueous dispersion, in a gas phase process (EP-A-25 200) or in the melt, in the presence or absence of suitable aromatic vinyl polymers or impact modifiers. Suitable modifiers are for example maleic acid, methylmaleic acid, itaconic acid, tetrahydrophthalic acid, the anhydrides and imides thereof, fumaric acid, the mono- and diesters of these acids, for example with $C_1$- and $C_2$-$C_8$-alkanols, the mono- or diamines of these acids, N-phenylmaleimide, maleohydrazide, the chlorine of trimellitic anhydride, 4-acetoxycarbonylphthalic anhydride, chloroethanoylsuccinaldehyde, chloroformylsuccinaldehyde, citric acid and hydroxysuccinic acid. Such modified polyphenylene ethers are known for example from U.S. Pat. No. 4 097 556, JP-A-59/59 724, WO-A-85/5372, WO-A-86/2086, WO-A-87/00540, EP-A-25 200, EP-A-121 974, EP-A-222 246, EP-A-222 250, EP-A-223 115, EP-A-223 116, EP-A-226 002, EP-A-253 123, EP-A-253 334, EP-A-254 048, EP-A-266 055 and German Patent Applications P 38 12 946.9, P 38 12 947.7 and P 37 36 851.6. In some of these cases, free radical initiators may be present.

As regards the physical properties of the polyphenylene ethers, preference is given to those which have a limiting viscosity of from 0.4 to 0.7 dl/g, measured in chloroform at 30° C.

It is also possible to use mixtures of polyesters with polyamides as component (A) of the molding compositions according to the present invention. The mixing ratio of polyamide:polyester is in general freely chooseable.

It is also possible, furthermore, to use mixtures of polyethers or polyamides with polyphenylene ethers as component (A), the mixing ratio of the polymers again being freely chooseable.

Preference is given to mixing polyamides with modified polyphenylene ethers in a mixing ratio of preferably from 20:80 to 80:20, in particular from 40:60 to 60:40.

Component (B) of the molding compositions according to the present invention comprises from 1 to 50, preferably from 1 to 20, in particular from 2 to 15, % by weight of a red phosphorus which contains, per 100 parts by weight, from 0.05 to 5, preferably from 0.5 to 1.5, parts by weight of a polyurethane or polyester-polyurethane as phlegmatizer.

The median particle size ($d_{50}$) of the phosphorus particles dispersed in the molding compositions is preferably within the range from 0.0001 to 0.5 mm.

The aqueous polyurethane or polyester-polyurethane dispersions are in general prepared by the process described in DE-A-2 645 779.

The red phosphorus is preferably phlegmatized by reacting an aqueous suspension thereof with an aqueous polyurethane dispersion. Preferably, the aqueous suspension contains up to 75 parts by weight of red phosphorus and the aqueous polyurethane dispersion contains up to 40 parts by weight of the polyurethane phlegmatizer.

The pH range of the phosphorus suspension is in general from 5 to 9. It is advantageous to use a reaction temperature of from 20° to 90° C., in particular from 25 to 85° C.

The residence time is preferably from 0.5 to 3 hours, an afterwards the phosphorus is separated off and dried in an inert gas stream, for example nitrogen, at from 80° to 120° C.

In general, the phlegmatized phosphorus in powder for is easily incorporable in the molding compositions according to the present invention.

It is also possible to use concentrates of phlegmatized red phosphorus, for example in a polyamide or an elastomer.

The molding compositions according to the present invention may also contain from 0 to 60, preferably from 5 to 50, in particular from 20 to 50, % by weight of a fibrous or particulate filler (component (C)), or a mixture thereof.

Preferred fibrous reinforcing materials (component (C)) are carbon fibers, potassium titanate whiskers, aramid fibers and particularly preferably glass fibers. If glass fibers are used, they can be dressed with a size and an adhesion promoter to improve their compatibility with the thermoplastic polyamide (A). In general, the glass fibers used have a diameter within the range from 6 to 20 μm.

These glass fibers can be incorporated not only in the form of short fibers but also in the form of continuous strands or rovings. In the ready-produced injection molding, the average length of the glass fibers is preferably within the range from 0.08 to 0.5 mm.

Suitable particulate fillers are amorphous silica, asbestos, magnesium carbonate (chalk), kaolin (in particular calcined kaolin), quartz powder, mica, talcum, feldspar and in particular calcium silicates such as wollastonite.

Preferred combinations of fillers are for example 15% by weight of glass fibers with 15% by weight of wollastonite and 15% by weight of glass fibers with 15% by weight of talcum.

Component (D) of the thermoplastic molding compositions according to the present invention comprises up to 20, preferably up to 15, % by weight of an elastomeric polymer.

Preferred elastomeric polymers are polymers based on olefins formed from the following components:

$d_1$) 40–100% by weight of at lest one α-olefin of 2–8 carbon atoms, $d_2$) 0–50% by weight of a diene, $d_3$) 0–45% by weight of a primary or secondary $C_1$–$C_{12}$-alkyl ester of acrylic or methacrylic acid or a mixture thereof, $d_4$) 0–40% by weight of an acid-functional or latently acid-functional monomer of an ethylenically unsaturated mono- or dicarboxylic acid, $d_5$) 0–40% by weight of an epoxy-containing monomer, $d_6$) 1–5% by weight of other free-radical polymerizable monomers with the proviso that component (D) is not an olefin homopolymer, nce an olefin homopolymer, for example polyethylene, is not as advantageous.

The first preferred group are the ethylenepropylene monomer (EPM) or ethylene-propylene-diene monomer (EPDM) rubbers, which preferably have a ratio of ethylene:propylene units within the range from 40:60 to 90:10.

The Mooney viscosities (MLI+4°/100° C.) of such—preferably crosslinked—EPM and EPDM rubbers (gel content in general below 1% by weight) are preferably within the range from 25 to 100, in particular from 35 to 90 (measured with the large rotor after 4 minutes at 100° C. in accordance with German Standard Specification DIN 53 523).

EPM rubbers in general have virtually no rubber bonds left, while EPDM rubbers can have from 1 to 20 double bonds/100 carbon atoms.

Suitable diene monomers $d_2$) for EPDM rubbers are for example conjugated dienes such as isprene and butadiene, non-conjugated dienes of from 5 to 25 carbon atoms such as penta-1,4-diene, hexa-1,4-diene, hexa-1,5-diene, 2,5-dimethylhexa-1,5-diene and octa-1,4-diene, cyclic dienes such as cyclopentadiene, cyclohexadienes, cyclooctadienes and dicyclopentadiene and also alkenylnorborenes such as 5-ethylidene-2-norbornene, 5-butylidene-2-norbornene 2-methallyl-5-norbornene, 2-isopropenyl-5-norbornene and tricyclodienes such as 3-methyltricylo[5.2.1.0.2.6]-3,8-decadiene, and mixtures thereof. Preference is given to hexa-1,5-diene, 5-ethylidenenorbornene and dicyclopentadiene. The diene content of the EPDM rubbers is preferably from 0.5 to 50, in particular from 2 to 20, particularly preferably from 3 to 15, % by weight, based on the total weight of the olefin polymer.

EPM and EPDM rubbers can preferably also be grafted with reactive carboxylic acids or derivatives thereof. These are in particular acrylic acid, methacrylic acid and derivatives thereof, and also maleic anhydride.

A further group of preferred olefin polymers are copolymers of α-olefins of 2–8 carbon atoms, in particular of ethylene, with $C_1$–$C_{18}$-alkyl esters of acrylic and/or methacrylic acid.

In principle it is possible to use any primary, secondary or tertiary $C_1$–$C_{18}$-alkyl ester of acrylic or methacrylic acid, but esters of 1–12 carbon atoms, in particular of 2–10 carbon atoms, are preferred.

Examples thereof are methyl, ethyl, propyl, n-butyl, isobutyl, t-butyl, 2-ethylhexyl, octyl and decyl acrylates and methacrylates. Of these, n-butyl acrylate and 2-ethylhexyl acrylate are particularly preferred.

The proportion of olefin polymer accounted for by methacrylic or acrylic ester $d_3$) is 0–60, preferably 10–50, in particular 30–45, % by weight.

Instead of ester $d_3$), or in addition thereto, the olefin polymers may also contain acid-functional and/or latently acid-functional monomers of ethylenically unsaturated mono- or dicarboxylic acids $d_4$) or epoxycontaining monomers $d_5$).

Examples of monomers $d_4$) are acrylic acid, methacrylic acid, tertiary alkyl esters of these acids, in particular tert-butyl acrylate, dicarboxylic acids such as maleic acid and fumaric acid, derivatives thereof and also monoesters thereof.

Latently acid-functional monomers for the purposes of the present invention are compounds which under the polymerization conditions or on incorporation of the olefin polymers into the molding compositions form free acid groups. Examples thereof are anhydrides of dicarboxylic acids of up to 20 carbon atoms, in particular maleic anhydride, and tertiary $C_1$–$C_4$-alkyl esters of the aforementioned acids, in particular tert-butyl acrylate and tert-butyl methacrylate.

The acid-functional or latently acid-functional monomers and the epoxy-containing monomers are preferably incorporated into the olefin polymers by addition to the monomer mixture of compounds of the general formulae I–IV

$$R_1C(COOR_2)=C(COOR_3)R_4 \qquad (I)$$

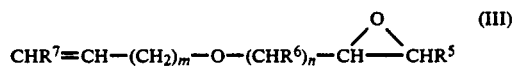

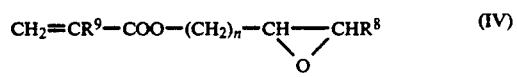

where $R^1$–$R^9$ are each hydrogen or alkyl of 1 to 6 carbon atoms, m is an integer from 0 to 20, and n is an integer from 0 to 10.

Preferably, each of $R^1$–$R^7$ is hydrogen, m is 0 or 1 and n is 1. The corresponding compounds are maleic acid, fumaric acid, maleic anhydride as $d_4$) and alkenyl glycidyl ethers or vinyl glycidyl ethers as $d_5$).

Preferred compounds of formula I, II, III and IV are maleic acid and maleic anhydride as component $d_4$) and epoxy-containing esters of acrylic and/or methacrylic acid, of which glycidyl acrylate and glycidyl methacrylate are particularly preferred for use as component $d_5$).

The proportion of component $d_4$) or $d_5$) is in each case from 0.07 to 40% by weight, in particular from 0.1 to 20, particularly preferably from 0.15 to 15, % by weight, based on the total weight of the olefin polymers.

Particular preference is given to olefin polymers formed from

50–98.9, in particular 60–95, % by weight of ethylene, 0.1–20, in particular 0.15–15, % by weight of glycidyl acrylate and/or methacrylate, acrylic acid and/or maleic anhydride, and 1–45, in particular 10–35, % by weight of n-butyl acrylate and/or 2-ethylhexyl acrylate.

Further preferred esters of acrylic and/or methacrylic acid are the methyl, ethyl, propyl, isobutyl and t-butyl esters.

Suitable other monomers $d_6$) are for example vinyl esters and vinyl ethers.

If such olefin polymers are used, their proportion is preferably from 0 to 20, in particular from 4 to 18, particularly preferably from 5 to 15, % by weight, based on the total weight of components (A) to (D).

The above-described ethylene copolymers are preparable in the conventional manner, preferably by random copolymerization under high pressure and elevated temperature.

The melt flow index of the ethylene copolymers is in general within the range from 1 to 80 g/10 (measured at 190° C. under load 2.16 kg).

Besides the aforementioned preferred elastomeric polymers based on olefins, suitable elastomers (D) also include for example the following polymers:

These are primarily emulsion polymers, the preparation of which is described for example in Houben-Weyl, Methoden der organischen Chemie, volume XII.I (1961) and in Blackley, Emulsion Polymerisation.

Basically, it is possible to use random elastomers or else elastomers with a shell structure. The shell-like structure is determined by the order of addition of the individual monomers.

Suitable monomers for preparing the rubber part of the elastomers are acrylates such as n-butyl acrylate and 2-ethylhexyl acrylate, corresponding methacrylates, butadiene and isoprene and mixtures thereof. These monomers can be copolymerized with further monomers such as styrene, acrylonitrile, vinyl ethers and further acrylates or methacrylates such as methyl methacrylate, methyl acrylate, ethyl acrylate and propyl acrylate.

The soft or rubber phase (having a glass transition temperature of below 0° C.) of the elastomers can form the core, the outer sheath or an in-between shell (in the case of elastomers having a more than two-shell structure); in the case of multi-shell elastomers, it is also possible for more than one shell to consists of a rubber phase.

If besides the rubber phase there are one or more hard components (having glass transition temperatures of more than 20° C.) involved in the structure of the elastomer, they are in general prepared by polymerizing styrene, acrylonitrile, methacrylonitrile, α-methylstyrene, p-methylstyrene, acrylic and methacrylic esters such as methyl acrylate, ethyl acrylate and methyl methacrylate as main monomers. Besides these it is again possible to use minor amounts of further comonomers.

In some cases it has proved advantageous to use emulsion polymers which have reactive groups at the surface. Such groups are for example epoxy, carboxyl, latent carboxyl, amino or amido groups and also functional groups which can be introduced by using monomers of the general formula

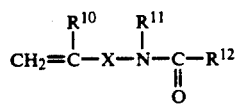

where the substituents may be defined as follows:
$R^{10}$ is hydrogen or $C_1$-$C_4$-alkyl,
$R^{11}$ is hydrogen, $C_1$-$C_8$-alkyl or aryl, in particular phenyl,
$R^{12}$ is hydrogen, $C_1$-$C_{10}$-alkyl, $C_6$-$C_{12}$-aryl or $OR^{13}$,
$R^{13}$ is $C_1$-$C_8$-alkyl or $C_6$-$C_{12}$-aryl, which may each be substituted by O- or N-containing groups,
X is a chemical bond, $C_1$-$C_{10}$-alkylene or $C_6$-$C_{12}$-arylene or

Y is O—Z— or NH—Z— and
Z is $C_1$-$C_{10}$-alkylene or $C_6$-$C_{12}$-arylene.

It is also possible to use the graft monomers described in EP-A-208 187 for introducing reactive groups at the surface.

Further examples are acrylamide, methacrylamide and substituted esters of acrylic or methacrylic acid such as (N-t-butylamino)ethyl methacrylate, (N,N-dimethylamino)ethyl acrylate, (N,N-dimethylamino)methy acrylate and (N,N-diethylamino)ethyl acrylate.

Furthermore, the particles of the rubber phase may also be in a crosslinked state. Suitable crosslinking monomers are for example 1,3-butadiene, divinylbenzene, diallyl phthalate, dihydrodicyclopentadienyl acrylate and also the compounds described in EP-A-50 265.

It is also possible to use graft-linking monomers, i.e. monomers having two or more polymerizable double bonds which polymerize at different rates. Preference is given to using those compounds where at least one double bond polymerizes at approximately the same rate as the other monomers, while the remaining double bond(s) reacts or react at a distinctly slower rate. The different rates of polymerization result in a certain proportion of unsaturated double bonds in the rubber. If such a rubber is subsequently grafted with a further phase, the double bonds present in the rubber react at least in part with the graft monomers to form chemical bonds; that is, the grafted-on phase is at least in part attached to the grafting base by chemical bonds.

Examples of such graft-linking monomers are allyl-containing monomers, in particular allyl esters of ethylenically unsaturated carboxylic acids such as allyl acrylate, allyl methacrylate, diallyl maleate, diallyl fumarate, diallyl itaconate and the corresponding monoallyl compounds of these dicarboxylic acids. Besides these there are a large number of other suitable graftlinking monomers; further details are given for example in U.S. Pat. No. 4 148 846.

In general, the proportion of component (D) accounted for by these crosslinked monomers is up to 5% by weight, preferably not more than 3% by weight, based on (D).

In what follows, some preferred emulsion polymers will be presented, starting with graft polymers having a core and at least one outer shell combined in the following structure:

| Type | Monomer for core | Monomer for sheath |
|---|---|---|
| D/1 | 1,3-Butadiene, isoprene, n-butyl acrylate, ethylhexyl acrylate or mixtures thereof | Styrene, acrylonitrile, methyl methacrylate |
| D/2 | As for A but with crosslinking agents | As for A |
| D/3 | As for A or B | n-Butyl acrylate, ethyl acrylate, methyl acrylate, 1,3-butadiene, isoprene, ethylhexyl acrylate |
| D/4 | As for A or B | As for A or C but with the use of monomers having reactive groups as described herein |
| D/5 | Styrene, acrylonitrile, methyl methacrylate or mixtures thereof | First sheath made of monomers described under A and B for the core Second sheath as described under A or C for the sheath |

Instead of graft polymers having a multi-shell structure it is also possible to use homogeneous, i.e. single-shell, elastomers formed from 1,3-butadiene, isoprene, and n-butyl acrylate or copolymers thereof. These products may likewise be prepared using crosslinking monomers or monomers having reactive groups.

Examples of preferred emulsion polymers are n-butyl acrylate/(meth)acrylic acid copolymers, n-butyl acrylate/glycidyl acrylate copolymers and n-butyl acrylate/glycidyl methacrylate copolymers, graft polymers having an inner core of n-butyl acrylate or a butadiene derivative and an outer sheath formed from the aforementioned copolymers and copolymers of ethylene with comonomers which provide reactive groups.

The above-described elastomers (D) may also be prepared by other conventional methods, for example by suspension polymerization.

Further suitable rubbers are those which act as impact modifiers for the polyphenylene ether B.

Examples are thermoplastic rubbers, such as polybutadiene, polybutene, polyisoprene, acrylonitrilebutadiene, ethylene propylene, polyester or ethylene rubbers, and elastomeric copolymers of ethylene and esters of (meth)acrylic acid, e.g. ethylene/butyl acrylate copolymers. It is also possible to mention ionomers, polyoctenylenes and preferably styrene-butadiene block copolymers including AB, ABA and ABAB block copolymers, which may also have tapered transitions, star block copolymers and the like, analogous isoprene block copolymers and (partially) hydrogenated block copolymers. These rubbers can also be used grafted with an aromatic vinyl monomer such as styrene (EP-A-234 063 and U.S. Pat. No. 4 681 915).

The rubbers D preferably have a glass transition temperature of below $-30°$ C., in particular below $-40°$ C. It will be readily understood that it is also possible to use mixtures of the aforementioned types of rubbers.

Besides the essential components (A) and (B) and the optional components (C) and (D) the molding compositions according to the present invention may also contain customary additives and processing aids. Their amount is in general up to 20, preferably up to 10, % by weight, based on the total weight of components (A) to (D).

Customary additives are for example stabilizers, antioxidants, agents against thermal decomposition and decomposition by ultraviolet light, lubricants, release agents, dyes, pigments and plasticizers.

Antioxidants and heat stabilizers which may be added to the thermoplastic compositions according to the present invention are for example halides of metals of group I of the Periodic Table, e.g. sodium, potassium and lithium halides, with or without copper(I), halides, e.g. chlorides, bromides or iodides. It is also possible to use zinc fluoride and zinc chloride. Other possibilities are sterically hindered phenols, hydroquinones, substituted representatives of this group and mixtures thereof, preferably in concentrations of up to 1% by weight, based on the weight of the mixture.

Examples of UV stabilizers are various substituted resorcinols, salicylates, benzotriazoles and benzophenones, which in general are used in amounts of up to 2% by weight.

Lubricants and release agents, which in general are added to the thermoplastic composition in amounts of up to 1% by weight, are stearic acid, stearyl alcohol, alkyl stearates, stearamides and also esters of pentaerythritol with long-chain fatty acids.

The additives also include stabilizers which prevent the decomposition of the red phosphorus in the presence of moisture and atmospheric oxygen. Examples are compounds of cadmium, zinc, aluminum, silver, iron, copper, antimony, tin, magnesium, manganese, vanadium, boron and titanium. Particularly suitable compounds are for example oxides of said metals, but also carbonates or oxycarbonates, hydroxides and also salts of organic or inorganic acids such as acetates, phosphates, hydrogen phosphates and sulfates.

In the case of polyamide/polyphenylene ether mixtures it is preferable to use mixtures of component B) with a preferably halogen-free phosphorus compound. The mixing ratio is in general within the range from 8:2 to 2:8, preferably from 7:3 to 3:7. Such phosphorus compounds are generally known, for example from German Patent Application P 37 32 907.3.

Suitable phosphorus-containing compounds are the compounds of the general structure

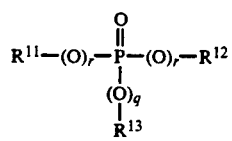

where $R^{11}$, $R^{12}$ and $R^{13}$ are each alicylyl, aralkyl or alkylaryl of up to 20 carbon atoms which may each in turn be substituted by halogen such as chlorine or bromine. q and r are zero or one. Preference is given here to the halogen-free compounds. Examples are phenyl bisdodecyl phosphate, phenyl bis(3,5,5-trimethylhexyl) phosphate, ethyl diphenyl phosphate, (2-ethylhexyl) dicresyl phosphate, bis(2-ethylhexyl) para-cresyl phosphate, bis(2-ethylhexyl) phenyl phosphate, dinonyl phenyl phosphate, phenyl methyl hydrogen phosphate, didodecyl para-cresyl phosphate, p-cresyl bis(2,5,5-trimethylhexyl) phosphate, (2-ethylhexyl) diphenyl phosphate, tri(2,6-dimethylphenyl) phosphate, triphenyl phosphate, tricresyl phosphate, diphenyl (2-ethylcresyl) phosphate, diphenyl cresyl phosphate, tri(isopropylphenyl) phosphate, diphenyl methyl phosphonate, diphenyl phenylphosphonate, triphenylphosphine oxide, tricresylphosphine oxide, tri(2,6-dimethylphenyl)phosphine oxide, tri(2-chloroethyl) phosphate and tri(2,3-dibromopropyl) phosphate. Particularly preferred components F are triphenylphosphate and triphenylphosphine oxide and also these compounds with up to 3 isopropyl substituents.

Besides these itis also possible to use compounds of the general formulae II and III

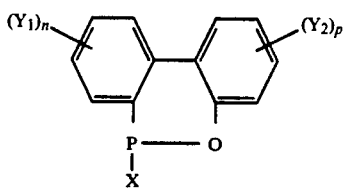

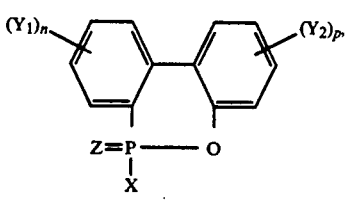

where X is hydrogen, hydroxyl, amino, $C_1-C_{10}$-alkyl, $C_1-C_{10}$-alkoxy or $C_1-C_{10}$-allyloxy, $Y_1$ and $Y_2$ are each $C_1-C_8$-alkyl or -alkoxy, Z is oxygen or sulfur, and n and p are each an integer from 0 to 4.

The thermoplastic molding compositions according to the present invention can be prepared in a conventional manner by mixing the starting components in customary mixing apparatus such as screw extruders, Brabender mills or Banbury mills and then extruding the mixture. After extrusion, the extrudate is cooled and comminuted.

Compositions according to the present invention may also be prepared by a process of pultrusion as described in EP-A-56 703. In this process, the glass fiber roving is impregnated with the polymer composition and then cooled and comminuted. In this case the glass fiber length is identical to the granule length, and is from 3 to 20 mm.

The molding compositions according to the present invention are notable for excellent stability and for good mechanical properties, resulting from an improved dispersion of the flameproofing component. In addition, they have excellent low-flammability properties.

Their preparation and processing presents substantially no problems, since the phlegmatized red phosphorus show little if any inclination to agglomeration and electrostatic charge buildup.

Owing to this property portfolio, the moldings producible from the molding compositions according to the present invention are particularly suitable for the electrical, automotive and civil engineering sectors.

Glass fiber reinforced moldings are used in particular as housing or switch components in electrical and electronic parts.

EXAMPLES

Starting components

Component (A1)

Polyhexamethyleneadipamide having a Fikentscher K value of 70, measured in a 1% strength by weight solution of 96% strength by weight sulfuric acid at 25° C. This K value corresponds to a relative viscosity of 2.5 or a viscosity number of 133.

Component (A2)

A modified polyethylene ether formed from
88% by weight of poly(2,6-dimethyl-1,4-phenylene) ether ($\eta_{red}$=0.63, measured in a 1% strength by weight solution in chloroform at 25° C.),
10% by weight of polystyrene (melt flow index at 200° C./ 5 kg load: 24 g/min)
2.0% by weight of maleic anhydride
was prepared by mixing the components at 290°–310° C. in a twin-screw extruder with subsequent devolatilization. The melt was passed through a waterbath, granulated and dried.

Component (B)

Red phosphorus of median particle size ($d_{50}$) 10–30 µm.

The phosphorus was phlegmatized with polyurethane (Astacin ® Finish FUD, BASF Aktiengesellschaft). To this end, 500 ml of an aqueous alkaline phosphorus suspension containing 250 g of red phosphorus (particle size 0.001–0.4 mm) were heated to 60° C. and brought to pH 8 by the addition of 5% strength sulfuric acid.

6.5 g of Astacin ® Finish PUD (40% strength aqueous anionic polyester-polyurethane dispersion prepared as described in DE-C3-2 645 779) were then stirred in. The suspension was subsequently stirred at 60° C. for one hour and then filtered. The filter residue was washed with water and then dried at 100° C. in a stream of nitrogen.

The polyurethane content was 1% by weight. Component (B') (for comparison)

Red phosphorus of median particle size ($d_{50}$) 45 µm (Exolit ® 385, from Hoechst). The phosphorus contained 0.5% by weight of dioctyl phthalate as coating.

Component (C)

Glass fibers having a diameter of 10 µm.

Component (D1)

An olefin polymer formed from:
59.8% by weight of ethylene,
35% by weight of n-butyl acrylate,
4.5% by weight of acrylic acid and
0.7% by weight of maleic anhydride,
having a melt flow index of 10 g/10 min at 190° C. under a load of 2.16 kg.

This copolymer was prepared by copolymerizing the monomers at elevated temperature and superatmospheric pressure.

Component (D2)

A styrene-butadiene-styrene three-block copolymer having a styrene content of 30% by weight.

The components were blended on a twin-screw extruder at 280°–320° C., component (D) only being added at the melt stage, and the blend was then extruded into a waterbath. The extrudate was granulated, dried and injection-molded into test specimens.

The flammability rating is determined by the UL 94 test on 1/16 inch test specimens following customary conditioning. The limiting oxygen index (LOI) was determined by ASTM 2863-77.

The phosphorus damage rate (proportion of soluble phosphorus derivatives) was determined following immersion of the moldings in water at 60° C. by sampling the water at regular intervals and determining its phosphorus content.

The tensile strength was determined by German Standard Specification DIN 53 455, the damaging energy ($W_{50}$) on test boxes and roundels in line with German Standard Specification DIN 53 433 part 1, the tensile strength $a_n$ by German Standard Specification DIN 53 453, the comparative tracking index (CTI) by IEC 112 (1979) and the notched impact strength (IZOD) by ISO 180/4A).

The makeups of the molding compositions and the results are summarized in the table.

TABLE

| No. | Composition [% by weight] | Flammability rating by UL 94 (1/16") | LOI | Phosphorus damage rate [ppm/10 days] | Tensile strength [N/mm²] | Impact strength $a_n$ [kJ/m²] | Damaging energy $w_{50}$ [Nm] Box | Roundel | CTI [volt] |
|---|---|---|---|---|---|---|---|---|---|
| 1 | 67.3 (A1) 7.0 (B) 25 (C) - 0.7 ZnO | VE-0 | 24.8 | 20 | 175 | 43 | 1.1 | 2.4 | 425 |
| 2 | 60.2 (A1) 6.2 (B) 27 (C) 6 (D1) 0.6 ZnO | VE-0 | 26.0 | 10 | 150 | 50 | 4.0 | 3.0 | 525 |
| 3 | 67.4 (A1) 6.8 (B) 25 (C) - 0.8 CdO | VE-0 | 25.7 | 18 | 170 | 44 | 1.2 | 2.4 | 450 |
| 4* | 67.5 (A1) 6.9 (B') 25 (C) - 0.6 ZnO | VE-0 | 25.6 | 25 | 160 | 35 | 1.0 | 2.1 | 400 |
| 5* | 60.0 (A1) 6.3 (B') 27 (C) | VE-0 | 25.7 | 15 | 140 | 44 | 3.0 | 2.7 | 475 |

TABLE-continued 6 (D1) 0.7 ZnO

*for comparison

| No. | Composition [% by weight] | Flammability rating by UL 94 (1/16") | Izod notched impact strength [kJ/m²] | |
|---|---|---|---|---|
| | | | 23° C. | −40° C. |
| 6 | 87 (A1) + (A2)* 3 (B) 10 (D2) | VE-0 | 12 | 4 |
| 7 | 84 (A1) + (A2)* 4 (B) 12 (D2) | VE-0 | 16 | 5 |
| 8 | 85 (A1) + (A2)* 2 (B) 10 (D2) | VE-0 | 15 | 4 |
| 9*** | 87 (A1) + (A2)* + 3 (B') 10 (D2) | VE-0 | 9 | 3 |
| 10*** | 85 (A1) + (A2)* + 2 (B') 10 (D2) + 3 (X)** | VE-0 | 12 | 2 |

*Mixing ratio: 47% by weight of (A2) + 53% by weight of (A1)
**Triphenylphosphine oxide
***For comparison

We claim:
1. A flameproofed thermoplastic molding composition containing
   (A) 10–99% by weight of a thermoplastic polyester, polyphenylene ether, mixture thereof, or mixture thereof with a thermoplastic polyamide,
   (B) 1–50% by weight of red phosphorus having a particle size of up to 2 mm which contains per 100 parts by weight from 0.05 to 5 parts by weight of a polyurethane or polyester-polyurethane coated thereon as phlegmatizer,
   (C) 0–60% by weight of a fibrous or particulate filler or a mixture thereof and
   (D) 0–20% by weight of an elastomeric polymer.

2. The flameproofed thermoplastic molding composition of claim 1, wherein component (A) is a mixture of a thermoplastic polyphenylene ether with a thermoplastic polyamide.

3. The flameproofed thermoplastic molding composition of claim 1, wherein said phlegmatizer is a polyester-polyurethane.

4. The flameproofed thermoplastic molding composition of claim 2, wherein said phlegmatizer is a polyester-polyurethane.

5. A flameproofed thermoplastic molding composition as claimed in claim 1, consisting of
   10–94% by weight of component (A),
   1–30% by weight of component (B) and
   5–30% by weight of component (C).

6. A flameproofed thermoplastic molding composition as claimed in claim 1, consisting of
   10–93% by weight of component (A),
   1–20% by weight of component (B),
   5–50% by weight of component (C) and
   1–20% by weight of component (D).

7. A flameproofed thermoplastic molding composition as claimed in claim 1, wherein the proportion of phlegmatizer in component (B) is from 0.5 to 1.5 parts by weight per 100 parts by weight of phosphorus.

8. A flameproofed thermoplastic molding composition as claimed in claim 1, wherein the filler composition glass fibers or wollastonite or a mixture thereof.

9. A flameproofed thermoplastic molding composition as claimed in claim 1 wherein the polyester (component (A)) is a mixture of
   30–99% by weight of a thermoplastic polyester based on an aromatic dicarboxylic acid and
   1–70% by weight of a polycarbonate based on an aromatic dihydroxy compound.

10. A flameproofed thermoplastic molding composition as claimed in claim 1, wherein component (A) contains a mixture of
    2–98% by weight of polyamide and
    98–2% by weight of polyester.

11. A flameproofed thermoplastic molding composition as claimed in claim 1, wherein component (D) is an olefin polymer formed from
    $d_1$) 40–100% by weight of at least one α-olefin of from 2 to 8 carbon atoms,
    $d_2$) 0–50% by weight of a diene,
    $d_3$) 0–45% by weight of a primary or secondary $C_1$-$C_{12}$-alkyl ester of acrylic or methacrylic acid or a mixture thereof,
    $d_4$) 0–40% by weight of an acid-functional or latently acid-functional monomer of an ethylenically unsaturated mono- or dicarboxylic acid,
    $d_5$) 0–40% by weight of an epoxy-containing monomer and
    $d_6$) 0–5% by weight of another free radical polymerizable monomer.

12. A molding obtainable from a flameproofed thermoplastic molding composition as claimed in claim 1.

* * * * *